Aug. 9, 1960    R. L. PATE    2,948,384
BELT CONVEYOR STRUCTURE
Filed Oct. 27, 1958    4 Sheets-Sheet 1
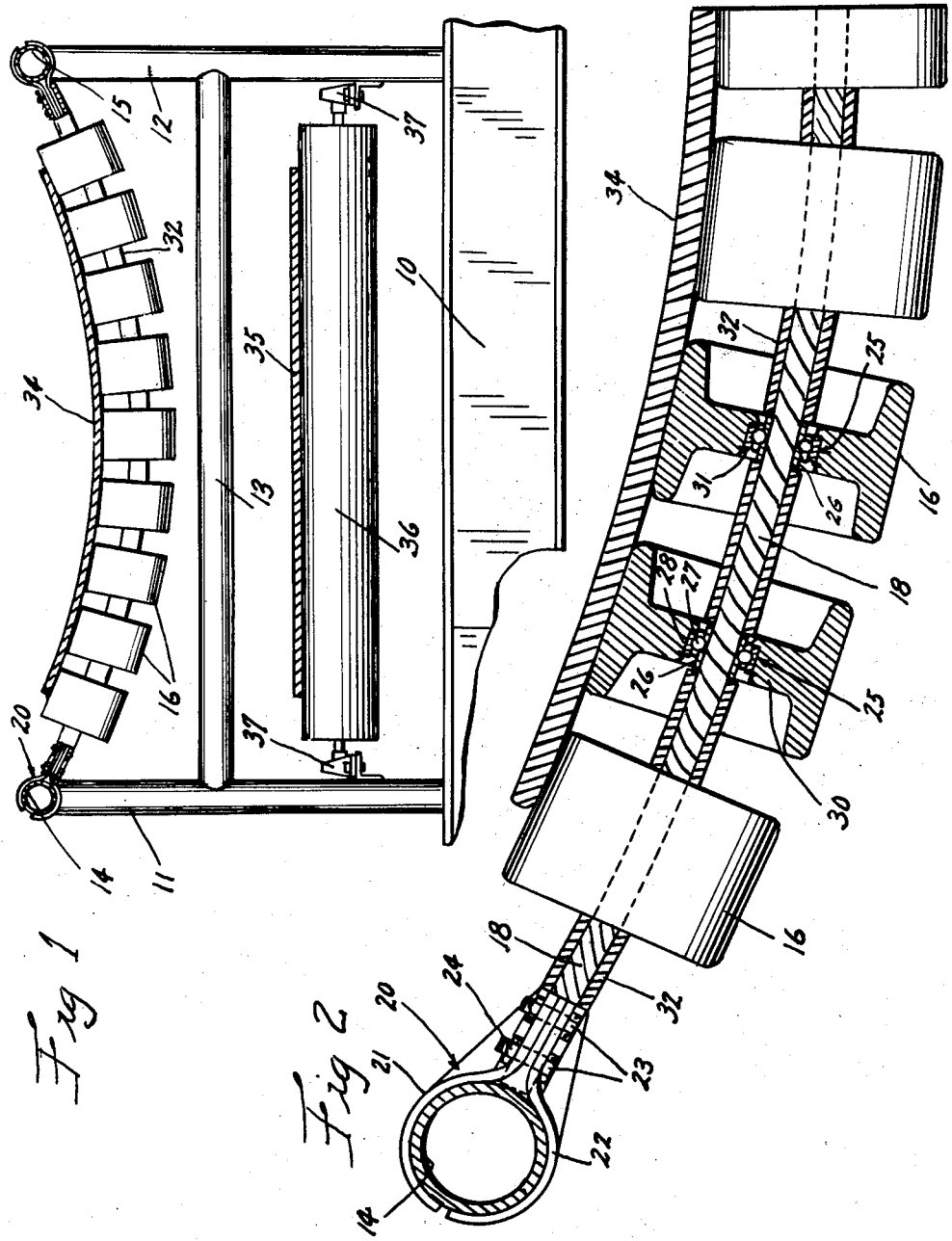
Inventor:
Robert L. Pate, Aug. 9, 1960     R. L. PATE     2,948,384
BELT CONVEYOR STRUCTURE
Filed Oct. 27, 1958     4 Sheets-Sheet 2
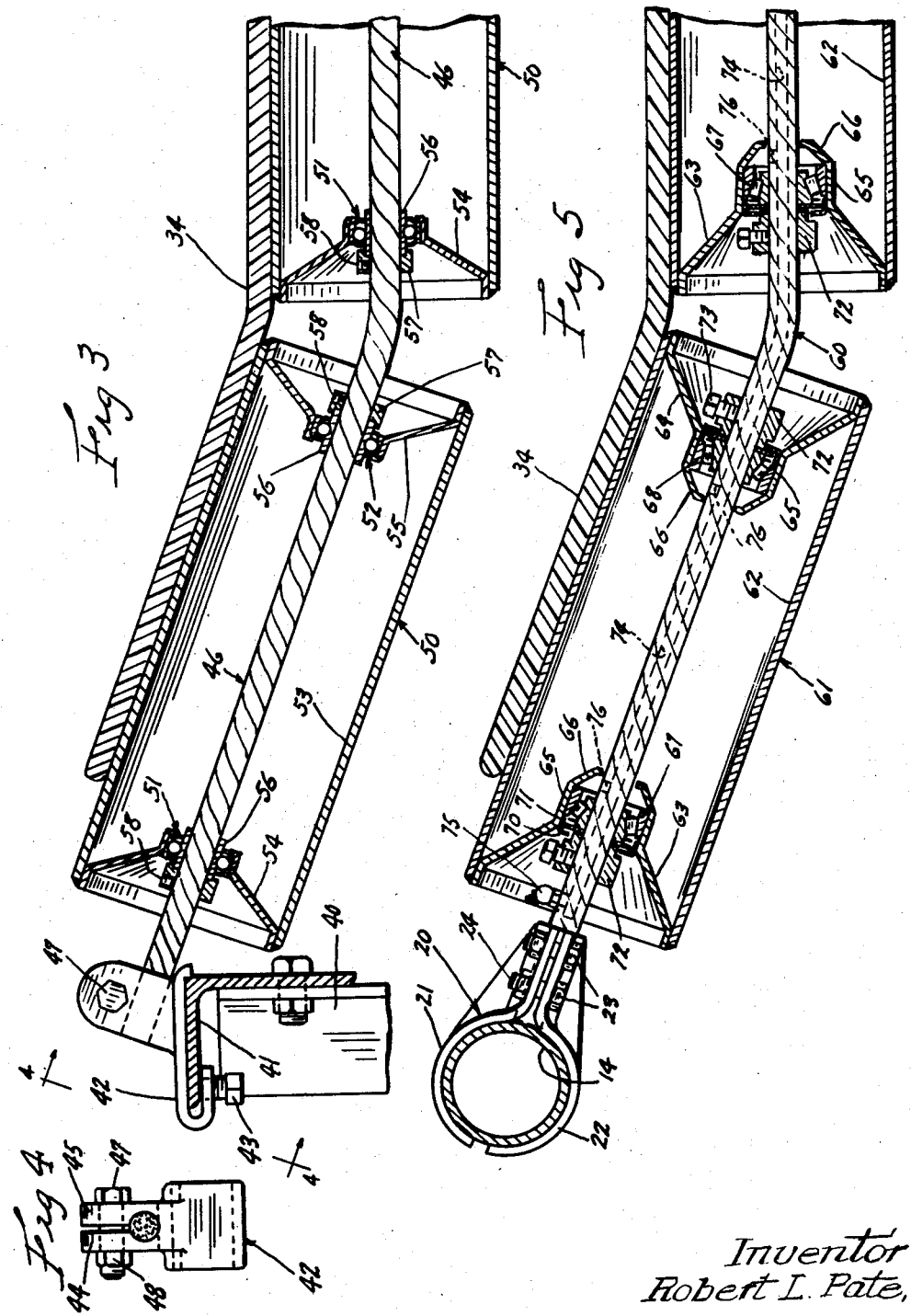
Inventor:
Robert L. Pate,
By Byron, Hume, Groen & Clement
Attys Aug. 9, 1960 R. L. PATE 2,948,384
BELT CONVEYOR STRUCTURE
Filed Oct. 27, 1958 4 Sheets-Sheet 3
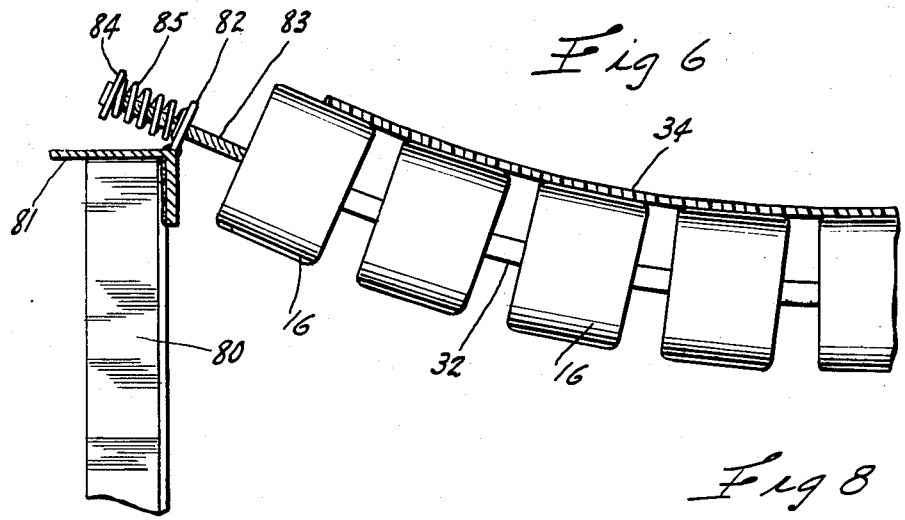
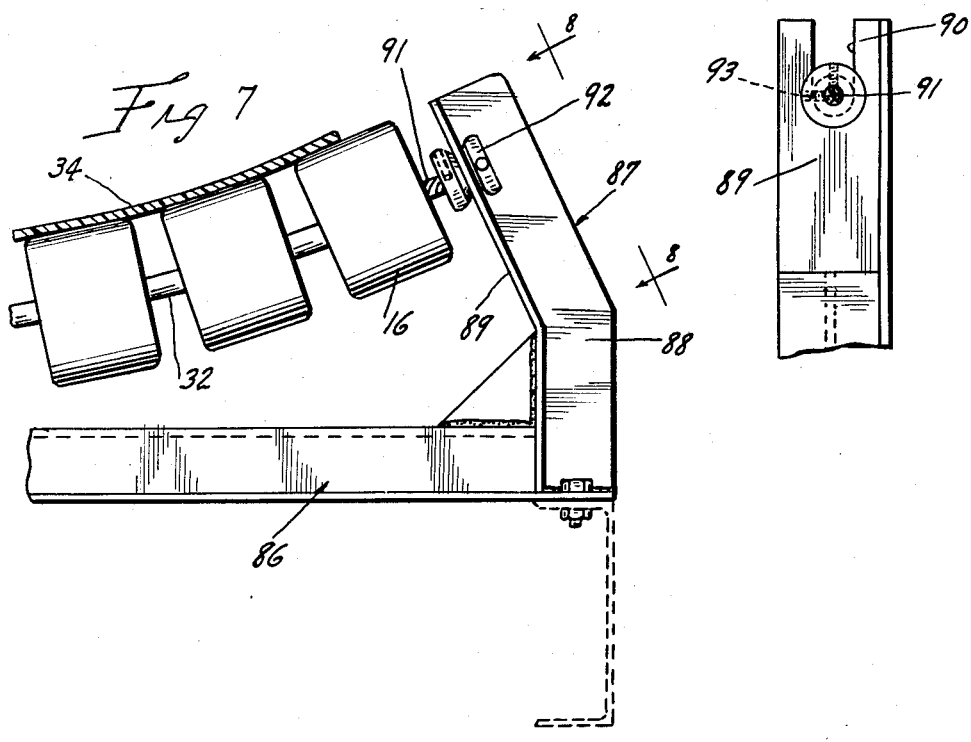
Inventor
Robert L. Pate,
By Byron Hume Groen & Clement
attys.

Aug. 9, 1960   R. L. PATE   2,948,384
BELT CONVEYOR STRUCTURE
Filed Oct. 27, 1958   4 Sheets-Sheet 4

INVENTOR.
Robert L. Pate,
BY
Byron Hume Groen & Clement
Attys.

United States Patent Office 2,948,384
Patented Aug. 9, 1960

2,948,384

BELT CONVEYOR STRUCTURE

Robert L. Pate, Pittsburg, Kans., assignor to The McNally Pittsburg Manufacturing Corporation, Pittsburg, Kans., a corporation of Kansas Filed Oct. 27, 1958, Ser. No. 769,683

9 Claims. (Cl. 198—192)

The invention relates to belt conveyor structure and has reference more particularly to a belt conveyor roller unit wherein the idler rollers thereof are journalled by means of bearing assemblies and which are mounted on a flexible cable stationarily fixed to the conveyor framework.

Belt conveyors as generally constructed in the past have employed a framework on which the idler roller units are supported at spaced locations along the length of the framework. Also the construction of each idler roller unit has included a frame made of plates and channels, the same providing uprights for supporting the idler rollers. One of the objectives of the invention is simplification in the construction of belt conveyors and in this respect the invention is outstanding and unique in that the frame for the idler rollers can be eliminated since the flexible cable may be fixed at each end directly to the pipe or angle iron of the conveyor framework.

Another and more specific object of the invention is to provide a belt conveyor characterized by a flexible cable on which the idler rollers are journalled by means of bearing assemblies, and wherein the flexible cable is stationarily fixed at its respective ends to the conveyor framework. Numerous advantages result from the structure as described. For example, when the conveyor is to carry a greater load more idler rollers can be added and with each roller a bearing is also added. In addition a flexible cable is best able to take the impact of large lumps of material as they pass from one idler roller to another since the profile of the conveyor is able to change. Also when the cable is able to move and flex the rollers and bearings are relieved of most of the shock caused by the load.

A further object resides in the provision of belt conveyor structure characterized by a stationary but flexible cable having idler rollers journalled thereon by means of bearing assemblies and wherein the flexible cable is tubular and is provided with lubricating fittings for maintaining the bearing assemblies adequately lubricated.

Another object is to provide belt conveyor structure of the character described wherein the stationary but flexible cable is suspended between uprights by means of coil springs located at each end of the cable.

Another object is to provide improved structure for mounting idler rollers on a flexible cable which is in turn fixedly secured to spaced uprights, wherein the idler rollers are individually journalled on the cable by bearing assemblies, and which are maintained in spaced relation with each other by the use of collars fixed to the bearing assemblies or by the use of spacing members supported by the cable.

Another object is to provide a simplified construction of idler roller unit for a belt conveyor and in particular to provide a unit that can be readily installed, easily serviced and a unit that can be located or relocated in desired relation to other units.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts:

Figure 1 is a sectional view taken transversely through the structural framework of a belt conveyor and illustrating suspension belt-troughing roller structure embodying the improved features of the present invention;

Figure 2 is an enlarged fragmentary detail view of the suspension belt-troughing roller structure of Figure 1;

Figure 3 is an enlarged fragmentary detail view of a modified form of suspension belt-troughing roller structure coming within the invention;

Figure 4 is an end view taken substantially along line 4—4 of Figure 3;

Figure 5 is an enlarged fragmentary detail view of another modified form of suspension belt-troughing roller structure coming within the invention;

Figure 6 is a sectional view taken transversely through the structural framework of a belt conveyor and illustrating the use of coil springs for supporting the flexible cable of the roller structure at its respective ends;

Figure 7 is a view similar to Figure 6 but illustrating a different form of connection for the ends of the flexible cable;

Figure 8 is an end view taken substantially along line 8—8 of Figure 7;

Figure 9:
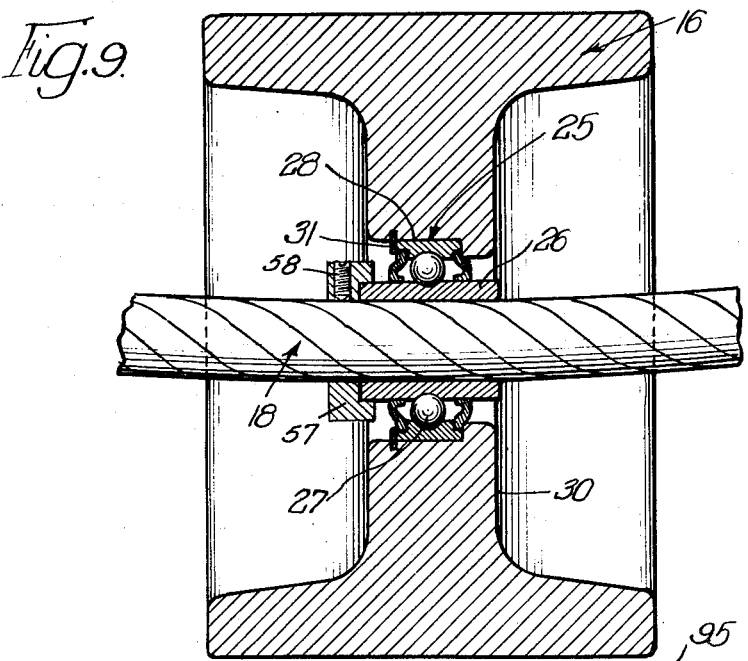
Figure 9 is an enlarged sectional view showing the roller and bearing assembly of Figure 2 with a clamp being used instead of the spacers to retain the bearing sleeve.

Referring to the drawings and in particular to Figures 1 and 2, which illustrate an embodiment of the invention, the numeral 10 indicates a base member providing supporting structure for the framework of a belt conveyor, the said framework including uprights 11 and 12 suitably connected by the transverse member 13. The framework, including the uprights 11 and 12 and transverse connecting member 13, is located at spaced intervals along the length of the belt conveyor and the said framework units are thus connected longitudinally by the members 14 and 15 which essentially consist of sections of pipe located on respective sides of the conveyor framework and being suitably secured as by welding to the uprights 11 and 12, respectively.

A plurality of idler rollers such as 16 are suspended by the flexible cable 18 between the longitudinal members 14 and 15. Each roller 16 is journalled on the cable 18 in a manner to be more particularly described and the said flexible cable is fixedly secured at its respective ends to the longitudinal members 14 and 15 by means of releasable clamps designated in their entirety by numeral 20. Each clamp 20 consists of a pair of sectional members 21 and 22, each having an arcuate portion at one end and a shank portion at their opposite end. The arcuate portion of each member has clamping relation with one of the longitudinal pipe sections, either 14 or 15, and the shank portions have clamping relation with their respective end of the flexible cable 18, an end of the cable having location between the shank portions of each clamp and which portions receive the securing bolts 23. The securing bolts 23 receive the nuts 24 and in this manner the sectional members are fixedly secured to an end of the cable 18 and said end is clamped to a longitudinal member of the conveyor framework.

Each of the rollers 16 is mounted for independent rotation on the flexible cable 18 by means of its individual bearing assembly such as 25. The assembly may consist of a sleeve such as 26 having telescoping relation on the cable 18, a plurality of ball bearings such as 27, and a bearing housing therefor identified by numeral 28. Each roller is provided with a central web 30 of reduced thickness compared to that of the roller, and the web of each roller is formed with a central opening for receiving its bearing assembly 25. Each bearing assembly is held within its opening by means of a retaining washer 31.

Although ball bearings are shown in Figure 2, it will be understood that any type of roller bearing, ball bearing, or plain bearing can be employed for journalling the roller 16 on the flexible cable 18, the cable being stationarily fixed at its respective ends to the members 14 and 15 of the conveyor framework. Some form of spacing means may be employed for maintaining the rollers in desired spaced relation on the flexible cable. As, for example in Figures 1 and 2, hose spacers 32 are located between the bearing assemblies 25. Of course, any kind of set collar or flexible spacer can be used. As a matter of fact, if the bearing assemblies can be set tight enough on the cable by using set screws or the like, there will be no need for hose spacers or similar elements.

The flexible cable having the idler rollers journalled thereon provides a suspension belt-troughing roller structure which is adapted to support the upper run 34 of an endless conveyor belt. It is preferred to have the rollers 16 extend for the full transverse width of the conveyor belt and to even project beyond the respective sides of the belt, as clearly shown in the drawings, so that the belt will be adequately supported throughout its entire width. The return run 35 of the conveyor belt is supported at intervals by the return idler rollers 36, each said roller extending transversely of the conveyor framework from adjacent upright 11 to adjacent upright 12 and being journalled at its ends by journalling structure indicated in its entirety by numeral 37.

Figure 3 illustrates a modification of the invention wherein the rollers are tubular in construction and are considerably longer than rollers 16 so that only three are required for producing an idler roller unit.

The uprights such as 40, which are spaced longitudinally of the conveyor framework, are joined by the angle member 41, the said angle member therefor extending longitudinally of the said framework. A clamp such as 42 is supported by the member 41, being fixedly secured thereto in desired position longitudinally of the member by the set screw 43. The clamp 42 provides sectional members such as 44 and 45 and an end of the flexible cable 46 is inserted between the sectional members adjacent the base thereof, the same being arcuately recessed for receiving the end of the cable. It is relatively easy to clamp the cable end in place since the sectional members receive the securing bolt 47 to which is applied the nut 48.

By means of the structure above described the flexible cable 46 is fixed at each end, being suspended transversely of the conveyor framework between uprights 40 thereof. A plurality of rollers such as 50 are individually journalled on the flexible cable by means of bearing assemblies which in this modification consist of a bearing member 51 at the left end of the roller and a similar bearing member 52 at the right hand end. Each roller may consist of a cylindrical member such as 53 which receives at its respective ends inwardly dished, end closure members 54 and 55, said closure members receiving and retaining bearing members 51 and 52, respectively. Each bearing member may include a sleeve such as 56 and the roller structure as described is retained in proper spaced relation on the flexible cable by the collars 57 held to the cable by set screws 58.

In the modification of Figure 5 the flexible cable 60 is clamped at each end to longitudinal members 14 and 15 by means of the clamps such as 20 similar in all respects to the clamp shown in Figures 1 and 2. The rollers comprising the idler unit are identified by numeral 61 and in accordance with the invention each roller is journalled for independent rotation on the suspension cable 60 fixedly secured at its respective ends as described. Each roller includes a tubular portion having inwardly dished, end closure members 63 and 64 at its respective ends. The inwardly extending end of each closure member is formed to provide a cylindrical portion 65 and a nose portion 66, the latter extending inwardly beyond its adjacent cylindrical portion. A roller bearing member 67 is located within cylindrical portion 65 of member 63 and in a similar manner roller bearing member 68 is located within cylindrical portion 65 of the end closure member 64. Both bearing members are securely mounted on the flexible cable 60, and, as regards each bearing member, the nose portion of its respective closure member is spaced some distance inwardly of the bearing to provide a closed space on this inward side of the bearing. On the opposite side of each bearing member, that is, exteriorly of the same, the cylindrical portion 65 is closed by the cap 70 and plate 71. Spacing members for the rollers may take the form of collars such as 72 and which are held to the flexible cable 60 by the set screw 73.

In this modification the flexible cable 60 is cored centrally to provide the central passage 74, the same extending from adjacent one clamped end of the cable to adjacent the other clamped end. The central passage 74 provides a lubricating passage by means of which the bearing members can be maintained in a lubricated condition and which will not require removal of the rollers for performing the task. At each end of the cable adjacent the clamp 20 the cable is provided with a lubricating fitting 75, the same communicating with the central passage 74 and providing means for forcing a lubricant into the passage under pressure. An outlet opening for the escape of the lubricant from the passage is provided for each bearing member. The numeral 76 indicates the outlet openings for the lubricant and it will be observed that an opening is located adjacent each bearing and within the space formed by the nose portion 66 of its respective end closure member. The nose portion assists in retaining the lubricant in associated relation with its respective bearing. Accordingly, each bearing member is maintained in a lubricated condition at all times. Of course, some of the lubricant may work its way past the nose portion 66 since the portion has an opening therein permitting the passage of the flexible cable. Also some lubricant will work its way outwardly through the bearing but most of this lubricant will be confined within the bearing housing by the cap 70 and plate 71.

An outstanding feature of the present roller structure resides in the fact that the flexible cable is fixedly secured at its respective ends to supporting uprights in a manner which prevents rotation of the cable. It is not desired to have the cable rotate since the same is flexible and is suspended to form an arc so that any rotation thereof would be detrimental to the cable, particularly when under a heavy load. The problem, however, is effectively solved by individually journalling each roller so that the same may rotate freely and in an independent manner. With each roller being journalled on a stationary but flexible cable the roller structure is better able to take the impact of heavy loads on the belt conveyor as they move from one roller structure to another. In other words, the cable is built to move and flex and accordingly most of the shock to the rollers and to the bearings is eliminated. In some instances large lumps of material may be supported in an off-center relation and as these pass over the roller structure the curve of the cable will change to accommodate the off-center load. Additional flexibility can be incorporated in the roller structure by suspending each end of the flexible cable by using coil springs as shown in Figure 6. In this modification the uprights 80 supporting the longitudinal member 81 have suitably secured thereto as by welding a spring support 82. The flexible cable 83 carries the rollers 16 and hose spacers 32 and these parts are constructed and assembled on the cable, all in a manner as disclosed and described in connection with Figures 1 and 2. Each end of flexible cable 83 passes through an opening in the spring support 82 and each end ultimately receives the washer 84 suitably fixed to the cable. The coil spring 85 is confined between the washer 84 and the spring support 82 and as a result of this construction it will be understood that a coil spring 85 is accordingly interposed between each end of the cable and its connection with the supporting uprights.

Should it be desired to readily release the roller structure from its supporting uprights the modification of Figure 7 can be employed. In this modification the structural framework indicated by numeral 86 provides spaced uprights such as 87 which are in the form of angle members having an outwardly directed web 88 and a longitudinally directed web 89. The longitudinally directed web 89 is formed with a slot 90 directed downwardly from its top edge. The flexible cable 91 has mounted thereon the rollers such as 16 and the spacing members such as 32 and said cable at its respective ends is provided with a spool 92, fixedly secured to the cable by set screws 93. By locating the spool within the slot 90 the cable and rollers journalled thereon can be readily connected to the spaced uprights and suspended between the same, all in a manner as previously described.

Figure 10:
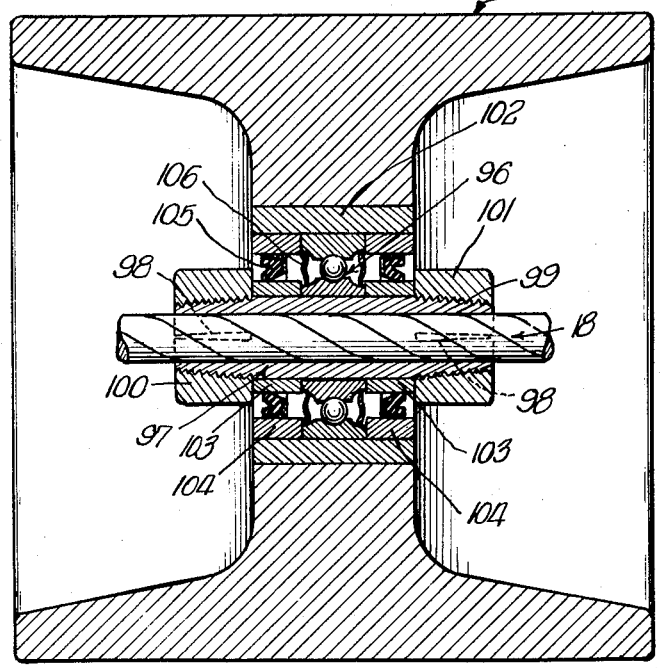
Figure 10 is a sectional view illustrating the structural details of a modified form of bearing assembly for journalling a roller on the flexible cable.

The roller bearing structure shown in Figure 10 includes the roller 95 which may be formed of metal, rubber or other suitable material, the ball-bearing assembly 96 and the metal sleeve 97. The sleeve 97 has telescoping relation with the flexible cable 18 and said sleeve is provided at each end with one or more longitudinal slots such as 98, whereby the ends of the sleeves can be tightened down on the cable. By reason of the slots 98 the sleeve ends can be contacted and for this purpose the sleeve ends are threaded as at 99 and the nuts 100 and 101 are threaded thereon. The said nuts have an opening which tapers slightly in order to contract the slotted ends of the sleeve as the nuts are tightened. For example, the opening at the right side of nut 100 is greater in diameter than the opening at the left side. The numeral 102 indicates the housing for the bearing assembly and said assembly is held within its housing and on the sleeve by the retaining rings 103 and 104. A flexible ring 105 of rubber or the like is located between each pair of retaining rings and a retaining washer 106 is provided for preventing dirt and the like from entering the bearing assembly and for holding grease and oil within the assembly for lubricating the ball bearings thereof.

The slots 98, extending longitudinally of the sleeve for a limited extent, permit contraction of the ends of the sleeve and which is accomplished by the threaded nuts 100 and 101. Thus the bearing assembly is held on the sleeve and the sleeve and roller are held in desired position on the flexible cable.

This application is a continuation-in-part of my copending application Serial No. 546,079, filed November 10, 1955, and entitled Belt Conveyor Structure which has been abandoned.

What is claimed is:

1. In belt conveyor mechanism, in combination with conveyor framework providing transversely spaced frame elements, a flexible cable suspended between said spaced frame elements, fastening means at each end of the flexible cable for fixedly securing the cable to the elements respectively, a plurality of idler rollers mounted on the cable, at least one bearing assembly for each idler roller for journalling the roller on the flexible cable, each bearing assembly including a sleeve in telescoping relation on the flexible cable, and bearing structure interposed between the said sleeve and the idler roller.

2. In belt conveyor mechanism, in combination with conveyor framework providing spaced frame elements, a flexible cable suspended between said spaced frame elements, fastening means at each end to the flexible cable for non-rotatably but releasably securing the flexible cable to the elements, respectively, a plurality of idler rollers on the flexible cable, a bearing assembly for journalling each roller for rotation, each bearing assembly including a sleeve in telescoping relation on the flexible cable and being fixed in a non-rotatable manner thereon, and bearing structure interposed between each said sleeve and its idler roller.

3. In belt conveyor mechanism, in combination with conveyor framework providing spaced frame elements, a flexible cable suspended between said frame elements, fastening means at each end of the flexible cable for non-rotatably but releasably securing the flexible cable to the elements, respectively, a plurality of idler rollers mounted on the flexible cable in spaced relation with each other, a bearing assembly for journalling each roller for rotation, each bearing assembly having location within its roller and including a sleeve in telescoping relation on the flexible cable and being held in a non-rotatable manner thereon, and means fixed to the flexible cable and having location on at least one side of each idler roller for maintaining the rollers in desired spaced relation.

4. In belt conveyor mechanism, a suspension belt-troughing roller structure comprising a flexible cable adapted to be suspended between spaced frame elements, fastening means at each end of the flexible cable for securing the cable to the elements respectively, whereby the cable is suspended in a manner preventing rotation of the cable, a plurality of idler rollers mounted on the flexible cable in spaced relation with each other, the mounting means for each roller including at least one sleeve in telescoping relation on the cable and bearing structure interposed between the sleeve and its roller, whereby the rollers are individually journalled on the cable for independent rotation, said cable having a central passage in the portion thereof located between the fastening means, a lubricating fitting at one end of the flexible cable in communicating relation with the central passage, and said cable having an outlet opening from the central passage in associated relation with each bearing structure.

5. A belt conveyor mechanism, as defined by claim 4, additionally including means on the flexible cable in associated relation with each sleeve for maintaining the rollers in desired spaced relation.

6. In belt conveyor mechanism, in combination with conveyor framework providing transversely spaced frame elements, a flexible cable secured to and suspended between said spaced frame elements in a manner preventing rotation of the cable, a plurality of idler rollers journalled for independent rotation on the cable, the journalling means for each idler roller including a sleeve in telescoping relation on the cable and bearing structure interposed between the sleeve and its roller, and means at each end of the sleeve for clamping its respective end to the flexible cable whereby the sleeve is held to the cable to prevent rotation of the sleeve thereon and said sleeve and the roller are maintained in desired spaced relation on the cable.

7. In belt conveyor mechanism, in combination with conveyor framework providing transversely spaced frame elements, a flexible cable suspended between said spaced frame elements, fastening means at each end of the flexible cable for non-rotatably but releasably securing the cable to the elements, respectively, a plurality of idler rollers journalled on the cable for independent rotation, a bearing assembly for journalling each roller, each assembly including at least one sleeve having telescoping relation with the cable, said sleeve having slotted ends which are exteriorly threaded, and means in threaded engagement with the said slotted ends for contracting the same to cause the sleeve ends to clamp the cable and anchor the sleeve and the roller in position thereon.

8. In belt conveyor mechanism, the combination with conveyor framework providing transversely spaced frame elements, of a flexible cable equipped with means at each end for attaching the said end to one of said frame elements whereby to suspend the flexible cable in a manner preventing rotation of the same, a plurality of idler rollers journalled for independent rotation on the cable, the journalling means for each idler roller including a sleeve on the cable in telescoping relation therewith, the said idler roller having a central web of reduced thickness compared to that of the periphery of the roller, said web having an axial opening in the same, bearing structure within said opening and being interposed between the web and the sleeve, said sleeve having slotted ends which provide for contraction of the said ends, and means carried by the sleeve for contracting the slotted ends whereby to fixedly clamp the sleeve to the flexible cable.

9. In belt conveyor mechanism, in combination with conveyor framework providing transversely spaced frame elements, a flexible cable secured to and suspended between said spaced frame elements in a manner preventing rotation of the cable, a plurality of idler rollers journaled for independent rotation on the cable, the journaling means for each idler roller including a sleeve in telescoping relation on the cable and bearing structure interposed between the sleeve and its roller, at least one end of the sleeve having means for clamping said end to the flexible cable whereby the sleeve is held to the cable to prevent rotation of the sleeve thereon and the sleeve and the roller are maintained in the desired spaced relation on the cable, and other means for securing the flexible cable to the spaced frame elements including a flexible connection for the cable capable of limited movement in all directions so that the flexible cable may adjust itself to any profile.

References Cited in the file of this patent

UNITED STATES PATENTS

| | | |
|---|---|---|
| 909,833 | Vrooman | Jan. 12, 1909 |
| 1,772,685 | Pollak | Aug. 12, 1930 |
| 1,946,431 | Vile | Feb. 6, 1934 |
| 2,127,643 | Glossmann | Aug. 23, 1938 |
| 2,698,077 | Baechli | Dec. 28, 1954 |
| 2,862,607 | Stamos et al. | Dec. 2, 1958 |

FOREIGN PATENTS

| | | |
|---|---|---|
| 871,267 | Germany | Mar. 23, 1953 |